United States Patent [19]

La White et al.

[11] 3,941,375
[45] Mar. 2, 1976

[54] PAPER TRANSPORTER

[75] Inventors: Eric L. La White, S. Royalton, Vt.;
Ernest G. Henrichon, Jr., Wellesley Hills; Harvey J. Bloom, Bellingham, both of Mass.

[73] Assignee: Xicon Data Entry Corporation, Newton Upper Falls, Mass.

[22] Filed: June 10, 1974

[21] Appl. No.: 477,809

[52] U.S. Cl. ............... 271/251; 271/272; 271/275
[51] Int. Cl.² ............................................. B65H 9/16
[58] Field of Search ............ 271/251, 275, 277, 272, 271/172, 3, 250, 248; 346/138, 132, 125

[56] References Cited
UNITED STATES PATENTS

| | | | |
|---|---|---|---|
| 2,695,785 | 11/1954 | Dashiell et al. | 271/275 X |
| 3,635,466 | 1/1972 | Townsend | 271/251 |
| 3,646,532 | 2/1972 | Winter | 271/251 X |

*Primary Examiner*—Evon C. Blunk
*Assistant Examiner*—Bruce H. Stoner, Jr.
*Attorney, Agent, or Firm*—Kenway & Jenney

[57] ABSTRACT

A paper transporter for use in conjunction with an optical character reader carries a sheet of paper to be read on a rotatable drum driven by a pair of opposed belts located at one end of the drum. One of the belts is canted slightly in order to steer the paper against a peripherally extending reference edge thereby locating the paper longitudinally and stabilizing its spatial orientation. The other belt is oriented in a direction that is substantially transverse to the longitudinal axis of the drum (not canted) so that it drives the drum and the interposed paper at a highly uniform speed as it passes a scanning device of the optical character reader. Both the steering belt and the drive belt are relatively narrow and grip only an edge portion of the page being scanned so that all of the printed portion of a typical page is exposed to the scanner. The dimensions of the drum and the area of contact between the drum and the belts are preferably selected so that the page is controlled alternately by the steering belt and the drive belt.

8 Claims, 5 Drawing Figures

PAPER TRANSPORTER

BACKGROUND OF THE INVENTION

This invention relates to paper handling devices and more specifically to paper transporters for use in conjunction with optical character readers.

It is well known in the art to scan a printed page with an optical character reader (OCR) or the like by mechanically transporting the page under a scanning pickup head. One arrangement utilizes a high speed shuttle mechanism which reciprocates the page in a tray. Another arrangement, having well-known speed, handling, and cost advantages, is to carry the page on a rotating drum. As the page rotates under a scanner, the OCR reads a narrow section or swath of the page which usually corresponds to a single printed line. On successive revolutions, the scanner indexes to read an adjacent swath until the entire page is read.

One method of driving the transporter drum and securing the paper to the drum in the desired location and spatial orientation is to utilize two belts or sets of belts that substantially encircle the drum at both of its ends. The belts rotate the drum and simultaneously grip and transport the paper carried on the exterior surface of the drum. It has been found, however, that this arrangement has various disadvantages which severely limit its effectiveness in reading lines of print, and particularly multiple lines of print that extend over substantially the entire surface of a page. First, it is difficult to align the paper accurately so that each line of print lies in a plane that is substantially normal to the longitudinal axis of the drum. Second, if a proper alignment is achieved, it is often difficult to maintain this alignment throughout the relatively large number of revolutions required to read a standard type or printed page. For example, if the paper is initially inserted into the carrier at a slight angle, this misalignment will cause the page to advance longitudinally with each revolution. This in turn can cause the scanner to lose synchronization within a line or between lines, read portions of two or more lines in one scan, or completely omit certain lines. Further, even if the paper is inserted correctly, slight differences in the speed, orientation, or tension of the belts located at opposite ends of the drum can cause an objectionable skewing of the paper resulting in the progressive longitudinal shift in the paper's position on the drum.

An alternative arrangement which avoids some of these problems utilizes a single belt mounted over a central portion of the rotatable drum and substantially encircling the drum except for a relatively small entrance and exit clearance formed between the looped belt ends. This arrangement, however, is unsuitable for reading pages of printed documents since the belt obscures a portion of the print. Another problem is that after a period of operation, the belt tends to accumulate the ink or pencil material forming the printed characters and transfer it to subsequent pages being transported and read.

It is therefore a principal object of this invention to provide a paper transporter that automatically adjusts the page to an accurately predetermined location and orientation and transports the paper under the scanning pick-up head at a highly uniform speed.

Another object of this invention is to provide a paper transporter that has a rugged and uncomplicated design and operates with a high degree of reliability.

Still another object is to provide a paper transporter that does not transfer print material between successive sheets of paper being transported and scanned.

Yet another object is to provide a paper transporter having these advantages which obscures only a small edge portion of the page being transported and scanned.

SUMMARY OF THE INVENTION

This invention provides a rotatable drum paper transporter driven by a pair of opposed, narrow belts that engage the exterior surface of the drum at one end. One belt is canted slightly in the direction of rotation of the drum towards a reference edge that aligns and locates a page on the drum. The other belt is in alignment with the reference edge so that it drives the drum and a page gripped between itself and the drum at a highly uniform speed as it passes under a scanning device of an OCR. Both the steering belt and the drive belt are relatively narrow and grip only a correspondingly narrow edge portion of the page. Preferably the steering belt is held against the drum with somewhat less tension than the drive belt in order to allow a longitudinal slippage of the paper towards the reference edge. The dimensions of the drum and the area of contact between the drum and the belts are preferably selected so that the page is controlled alternately by the steering belt and the drive belt.

In a preferred embodiment, a set of circumferentially surrounding paper guards assist in holding the page on the drum surface and paper inlet and outlet passages are provided at the gaps between the belts. Additionally, the exterior surface of the drum is sensitized so that the scanner detects the presence or absence of the paper thus allowing an unsynchronized insertion of the paper onto the transporter.

These and other features of this invention will be fully understood from the following detailed description of the preferred embodiments which should be read in conjunction with the accompanying drawings.

DETAILED DESCRIPTION OF THE PREFERRED EMBODIMENTS

Figure 1:
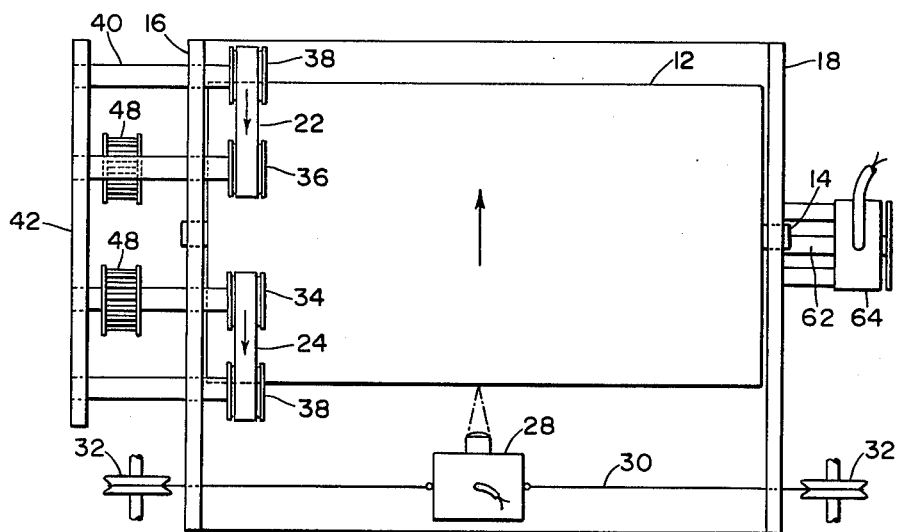
FIG. 1 is a top plan view of a paper transporter constructed in accordance with the invention.
Figure 2:
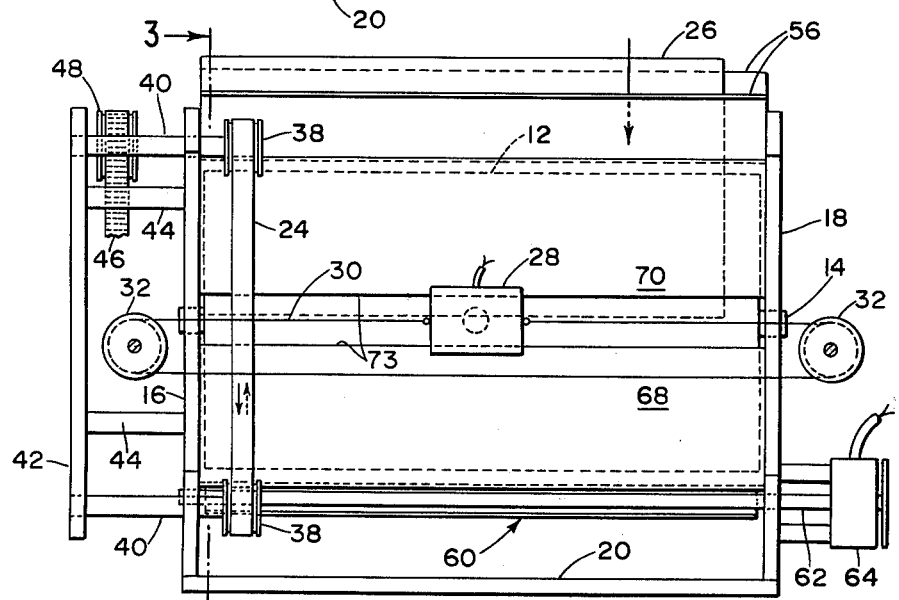
FIG. 2 is a view in front elevation of the paper transporter shown in FIG. 1.
Figure 3:
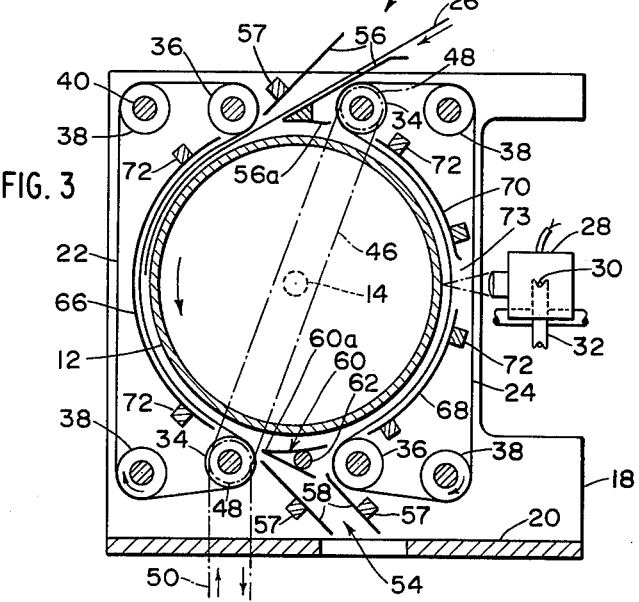
FIG. 3 is a view in vertical section taken along the line 3—3 of FIG. 2.

FIGS. 1–3 illustrate a paper transporter for use in conjunction with an optical character reader (OCR) having a freely rotatable drum 12 carried on a shaft 14 journaled in a pair of side support plates 16 and 18 that are mounted on a substantially transverse, horizontal base plate 20. A steering belt 22 and an opposed drive belt 24 located at the end of the drum 12 adjacent to the side plate 16 grip and transport a sheet of paper 26 on the exterior surface of the drum. The sheet 26 is inserted sideways to that as it rotates on the drum a single line of printed characters passes under a stopped photo-sensor scanning device 28. After scanning one line of print, the scanning device 28 advances horizontally in an incremental step to read an adjacent line of print on the subsequent revolution of the drum. The scanning device 28 is advanced by a looped cord 30 carried on a pair of pulleys 32 and mounted to opposite sides of the device 28. The signal generated by the device 28 as it scans the lines of print is processed and used as described in a commonly assigned, copending application, Ser. No. 477,808, filed of even date herewith.

The belts 22 and 24 are each carried on a set of four pulleys including a drive pulley 34, an idler pulley 36 and a pair of spacer pulleys 38. Each pulley is carried on a shaft 40 journaled in the side plate 16 and an auxiliary end plate 42 that is spaced apart from the side plate 16 by spacer bars 44 (FIG. 2). The two drive pulleys 34 are directly and positively linked by a belt 46 carried on a pair of ribbed drive pulleys 48. Another drive belt 50 connects the lower drive shaft 40 and the associated pulleys 34 and 48 with a suitably geared electric motor (not shown).

The pulleys 34 and 36 are located with respect to the surface of the drum 12 so that the belts 22 and 24 substantially encircle the drum over a narrow region proximate to the side plate 16. In addition, the location of the pulleys is such that the belts 22 and 24 bear against the surface of the drum with sufficient force to rotate the drum and to grip the sheet of paper 26 firmly. The belts 22 and 24 are preferably manufactured from a conventional belt material such as a neoprene impregnated woven cotton belt which offers the desired frictional, flexing, stretching and wear qualities.

The upper and lower gaps between the belts 22 and 24 provide convenient sheet input and output passages 52 and 54, respectively. At the input passage 52, an inclined, converging chute 56 guides the sheet to be scanned to the nip between the belt 22 and the drum 12. Rods 57, secured at their ends to the side plates 16 and 18 count the chute 56. The output channel 54 is defined by an inclined, parallel walled chute 58 that is similarly mounted on rods 57. Located at the mouth of the output passage 54 proximate the drum 12 is a stripper blade 60 which pivots about a rod 62 between a transfer position shown in FIG. 3 and a stripper position in which the edge 60a of the blade 60 nearly touches the surface of the drum. In the transfer position, the top surface of the blade 60 directs the sheet of paper 26 from the belt 22 to the nip between the belt 24 and the drum. In the stripper position, the edge 60a of the blade 60 enters the region between the sheet and the drum and the sheet is diverted along the bottom surface of the blade 60 to the output chute 58. A solenoid 64 periodically actuates the blade 60 to pivot to the stripping position in response to a signal from the OCR indicating that the sheet has been completely scanned.

A set of guards 66, 68 and 70 also assist in guiding the sheet of paper while it is carried on the drum. These guards each extend longitudinally between the side plates 16 and 18 and are closely spaced from the exterior surface of the drum. Rods 72 are attached to the outwardly facing surfaces of the guards and at their ends to the side plates 16 and 18 to fixedly mount the guards in this relationship. The guard 66 extends circumferentially over substantially the same angular distance as the region of contact between the belt 22 and the drum. The guards 68 and 70 are similarly located with respect to the belt 24 except that there is a gap between the guards 68 and 70 which provides a scanning clearance or viewing slot 73 for the photo-sensor device 28. The guards 66, 68 and 70, in conjunction with the upper surface of the stripper blade 60 and a lower guide portion 56a of the input chute 56, assist the belts in holding the sheet 26 on the drum.

Figure 4:
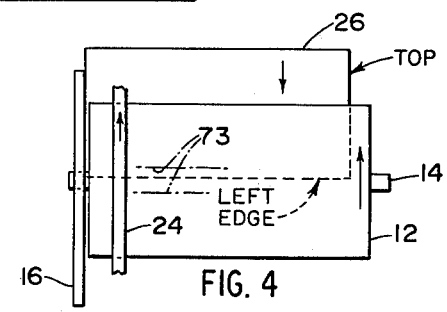
FIG. 4 is a simplified view corresponding to FIG. 2 showing the location and orientation of the drive belt and the page.
Figure 5:
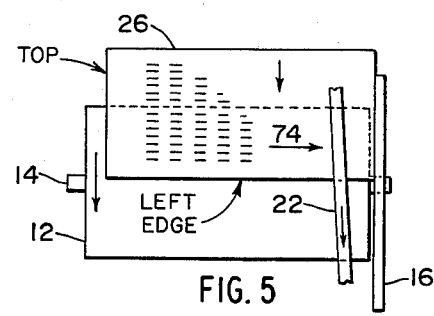
FIG. 5 is a simplified view in rear elevation corresponding to FIG. 4 showing the canted orientation of the steering belt with respect to the reference edge.

With reference to FIGS. 4 and 5, a principal feature of the invention is that the belt 22 is slightly canted towards the side plate 16 in the direction of rotation of the drum 12 to provide a component of force on the sheet 26 along the axis of rotation of the drum 12 in the direction indicated by the arrow 74. This longitudinal component of force causes a corresponding longitudinal slippage of the sheet 26 towards the side plate 16. The slippage continues until the bottom edge of the sheet 26 is in full contact with the inwardly directed face of the plate 16. The plate 16 thus serves as a reference edge or stopping surface which automatically aligns the sheet of paper with each line of print lying in a plane that is substantially transverse to the axis of rotation of the drum and imparts a uniform horizontal-longitudinal location to each sheet of paper carried on the drum. It has been found that a cant of only a few degrees is sufficient to locate and align a sheet of paper after only one or two revolutions. It has also been found that it is desirable to maintain the belt 22 under less tension than the belt 24 in order to promote the slipping movement of the paper against the reference edge. It should be noted that the action of the belt 22 not only provides an initial location and orientation of the sheet 26, but also maintains this relationship between the paper and the drum through any number of subsequent revolutions. The desired canting angle is achieved by a proper selection of the spacing between the side plate 16 and the upper pulleys 36 and 38 and the lower pulleys 34 and 38.

In contrast to the steering belt 22, the drive belt 24 is substantially perpendicular to the axis of revolution of the drum 12. Since the belt 24 serves primarily to rotate the drum 12 and to carry the sheet 26 past the viewing slot 73, this perpendicular orientation results in a highly uniform rotational speed of the characters printed on the sheet 26 as they pass under the scanning device 28. This in turn increases both the accuracy and the reliability of the OCR. It should be noted that both belts 22 and 24 are located close to the side plate 16 so that they grip only the bottom edge portion of the sheet 26. Moreover, both belts 22 and 24 are relatively narrow so that they do not cover the lines of print located near the bottom of the page being scanned.

In operation, a sheet of paper is inserted into the input passage 52 with its left edge leading and the side to be read facing upwardly. The leading edge of the paper is then gripped between the belt 22 and the drum 12 which pulls the paper onto the exterior surface of the drum. The belts 22 and 24 (assisted by other members as described above) hold the sheet in a predetermined longitudinal location and orientation on the drum throughout a complete revolution. Preferably the scanning device is inoperative during the first few revolutions of the drum following the insertion of a sheet 26 in order to allow the belt 22 to locate and align the sheet against the reference edge or side plate 16. During subsequent revolutions the scanning device 28 successively scans each line of the sheet beginning at the top edge and ending near the bottom edge at a point near the belt 24. During each revolution of the drum the device 28 scans one line of print and then incrementally advances to scan the next lower line on the subsequent revolution. When the page has been completely read, the solenoid 64 pivots the blade 60 to direct the sheet to the exit passage 54. The paper transporter is then ready to receive another sheet 26.

The exterior surface of the drum 12 is perferably coated with a material such as optically flat black paint which has different spectral properties from the paper 26 so that the scanning device 28 can discriminate between a "paper present" and a "paper not present" condition. A signal generated by the device 28 in response to this paper detecting function can then be used to control the movement of the scanning device itself as well as other mechanisms such as the solenoid 64 or an automatic sheet feed mechanism (not shown).

A typical operating speed for the paper transporter described herein above is two cycles per second. For illustrative purposes only, typical dimensions for the drum are a diameter of 6 inches and a length of 14 inches. This length allows the paper transporter to process documents up to the standard legal size. In view of the standard 8½ inch width of conventional sheets of paper, the diameter dimension of 6 inches has the advantage of placing the sheet of paper alternately under the full control of either belt 22 or belt 24. Thus, the steering and driving functions of these belts do not interfere with one another. It should be noted that when this device is operated in a low humidity environment, a mild static charge may develop which causes the sheet of paper 26 to adhere to the drum. If this occurs, a suitable ionizing device of conventional design should be provided near the paper exit passage to neutralize any static charge buildup developed during the operation of the paper transporter.

Although the invention has been described with reference to an opposed pair of belts that encircle one end of the drum, various alternative arrangements may be used to steer the paper against the reference edge and to drive the drum and the paper past a scanning site. For example, these functions can be accomplished by means of a series of wheels or rollers each of which engages the exterior surface of the drum and is driven at substantially the same rotational speed. With this arrangement, the steering function of belt 22 can be approximated by skewing the axis of rotation of one or more of the wheels with respect to the axis of rotation of the drum. Another arrangement employs a single belt having one portion thereof canted in the manner of the belt 22 and a second portion thereof aligned with the reference edge in the manner of the belt 24.

Still other variations within the scope of this invention include utilizing a pair of opposed belts, as described above, but with both of the belts canted to dynamically adjust the paper. This arrangement, of course, may offer a somewhat reduced uniformity of the paper speed as it passes under the scanning device. Yet another variation utilizes a direct drive of the drum, as through a pulley mounted on the shaft 14, rather than the belts 22 and 24.

Further, although the reference edge has been described as the side plate 16, an alternative arrangement is to form a shoulder or flanged portion near one edge of the drum. These and various other modifications of the invention will become apparent to those skilled in the art from the foregoing description and accompanying drawings. Such modifications are intended to fall within the scope of the appended claims.

What is claimed is:

1. A transporter of paper for use in conjunction with an optical character reader comprising,
   a drum freely rotatable about its central longitudinal axis,
   a reference edge located proximate one end of the drum and lying in a plane that is substantially transverse to said longitudinal axis, and
   means for gripping a narrow edge portion of the paper that is substantially free of print, said gripping means dynamically adjusting the paper against said reference edge as said drum and said paper rotate over a first portion of each revolution of the drum and said gripping means rotating said drum and the paper together at a highly uniform speed over a second portion of each revolution of the drum.

2. A transporter according to claim 1 in which said gripping means comprises an opposed pair of narrow belts that bear against said drum, one of said belts engaging said drum over said first portion in a direction that is canted toward said reference edge in the direction of rotation of said drum, and the other of said belts engaging said drum over said second portion in a direction that is substantially parallel to said reference edge.

3. A transporter of paper for use in conjunction with an optical character reader comprising
   a drum freely rotatable about its central longitudinal axis,
   a reference edge located proximate one end of the drum and lying in a plane that is substantially transverse to said longitudinal axis,
   a first belt engaging said drum and the paper over a first narrow region proximate said reference edge, said first belt and the region of engagement with said drum surface being canted slightly toward said reference edge in the direction of rotation of said belt and said drum over said region of engagement to dynamically adjust the paper, and
   a second belt located substantially opposite said first belt and engaging said drum and the paper over a second narrow region that is substantially parallel to said reference edge so as to drive the drum and the paper together at a highly uniform speed, said first and second regions of engagement of the paper being substantially free of print.

4. A transporter according to claim 3 further comprising a plurality of guards spaced closely from the exterior surface of said drum and substantially enclosing the exterior surface of said drum.

5. A transporter as defined in claim 4 in which said guards are spaced apart from one another to form longitudinally extending paper input and output passages and a viewing slot.

6. A transporter according to claim 3 in which said second belt means is engaged tightly to said drum to drive the paper under the viewing slot at a highly uniform rate, and said first belt means is engaged to said drum slightly less tightly to allow a longitudinal slippage of the paper against said reference edge.

7. A paper transporter as defined in claim 3 in which the exterior surface of said drum has optical characteristics different from those of paper.

8. A paper transporter according to claim 3 further comprising means for driving said first and second belts at substantially the same speed.

* * * * *